Nov. 11, 1947.  W. A. ARNOLD ET AL  2,430,551
OPTICAL SUPPORT
Filed April 28, 1945  3 Sheets-Sheet 1

WILLIAM A. ARNOLD
WAYNE G. NORTON
INVENTORS

BY
ATTY & AGT

Nov. 11, 1947.  W. A. ARNOLD ET AL  2,430,551
OPTICAL SUPPORT
Filed April 28, 1945  3 Sheets-Sheet 2

WILLIAM A. ARNOLD
WAYNE G. NORTON
INVENTORS

BY
ATT'Y & AG'T

Patented Nov. 11, 1947

2,430,551

UNITED STATES PATENT OFFICE 2,430,551

OPTICAL SUPPORT

William A. Arnold, Oak Ridge, Tenn., and Wayne G. Norton, Rochester, N. Y., assignors to Eastman Kodak Company, Rochester, N. Y., a corporation of New Jersey Application April 28, 1945, Serial No. 590,826

4 Claims. (Cl. 88—73)

This invention relates to optical mounts and particularly to mounts for optical systems in which the relative position of two or more elements is critical.

It is the object of the invention to provide a mount which minimizes or renders harmless the effects of thermal expansion and contraction or of non-uniform thermal expansion or contraction. The source of the temperature gradient in the mount or optical element in question may involve thermal conduction, convection or radiation or a combination of the three. The resulting error may be due to the over-all change in temperature, but in general the more annoying errors are transient in nature and are due to differences in the temperature at different points of the mount or optical element. Thus the object of the invention is to eliminate as far as possible any and all temperature gradients in the parts of the mount which are responsible for the critical spacing and orientation of the optical elements.

Specifically, it is an object of the invention to provide a mount for a pentareflector such as used at the receiving ends of a range finder. In small range finders, pentaprisms are used for this purpose, and even such prisms are not free from thermal errors. In large range finders, however, it is customary to use two front surface mirrors suitably clamped or otherwise supported, since such an arrangement can be manufactured more easily and more accurately than a large pentaprism. The present invention can be particularly well explained with reference to such a pair of mirrors since in the largest range finders their relative orientation is extremely critical, and the presence of even very minute changes is easily detectable.

Throughout the long history of optical range finders, the problem of eliminating thermal errors has been omnipresent. The usual procedure to minimize these errors has been to supply thermal insulation as far as possible and to make allowances or corrections in the reading obtained by periodically checking the zero setting of the instrument. The literature is replete with various other suggestions including bimetal strips and the like to compensate for the thermal errors, but none of these suggestions has been of much practical value.

In an urgent but complete investigation of this whole subject, we have found that full correction of thermal errors requires simultaneously two conditions which are apparently contradictory. In the first place the elements and mount should have a minimum thermal response, i. e., a minimum thermal coefficient of expansion. Theoretically, of course, a zero coefficient would give perfect results; but since that is impossible, the need for the present invention has always existed. Low thermal expansion materials include quartz and Invar and the like. In the second place, if there is any change in temperature, it should be uniformly distributed over the mount as rapidly as possible; this requires a high coefficient of thermal conductivity. In general the materials which have high thermal conductivity are those such as aluminum, and copper, which also have very high coefficients of thermal expansion. Thus the present invention is necessitated by the quandary that no known material simultaneously has high thermal conductivity and low thermal expansion.

According to the present invention, a mount for any optical unit having two elements whose relative position is critical is made up of two parts. One of these engages and supports the two elements and is made of quartz or Invar or the like having low thermal expansivity. The other part is a shield of high thermal conductivity, such as a plate of aluminum or copper, surrounding the otherwise exposed areas of the first part. There must be no rigid connection between the two parts since otherwise the expansion of the shield would be transmitted to the engaging and supporting part of the mount and would distort the orientation of the optical elements. A thin foil of aluminum or copper would not be entirely satisfactory as a shield because thermal conductivity is proportional to thickness, but any shield of high conductivity will do, such as an aluminum or copper plate thicker than $\frac{1}{32}$ of an inch. Preferably the shield is of metal having thermal conductivity greater than .1, most preferably aluminum, copper, or the like having a thermal conductivity greater than .4. Although even partial shielding has some useful effect, we prefer to extend this shield to surround all parts of the optical unit except where it would interfere with the path of the light beam through the unit. Quartz and Invar for the supporting means have coefficients of linear expansion less than $2 \times 10^{-6}$.

The highly conducting shield, according to the present invention, is directly in contradistinction to those forms of the prior art which employed insulating shields. Insulation may, of course, be used along with present invention, but in general it has been found quite unnecessary.

The invention and some of the remarkable results obtained thereby will be fully understood from the following discussion when read in connection with the accompanying drawings in which.

Figure 4:
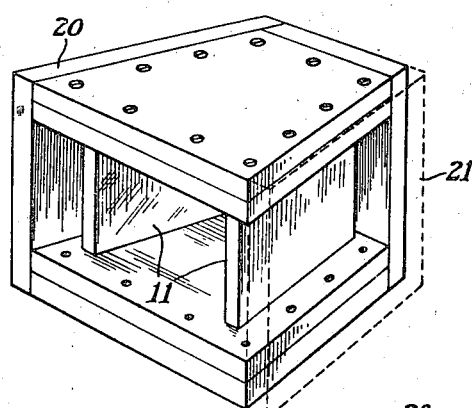
Figure 5:
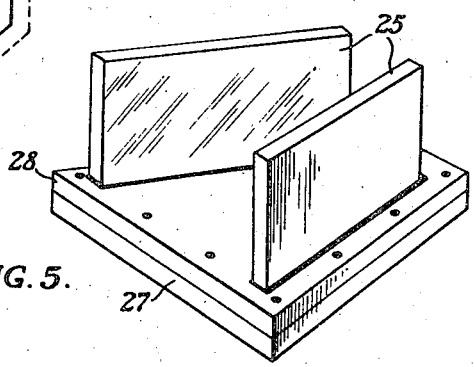

Figs. 4 and 5 similarly show pentareflectors according to the present invention.

Figure 6:
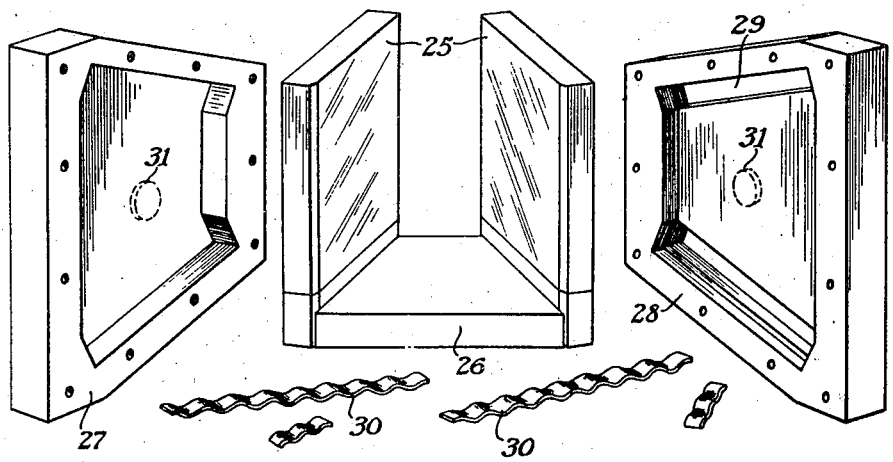

Fig. 6 shows the parts of the embodiment shown in Fig. 5, disassembled.

Figure 7:
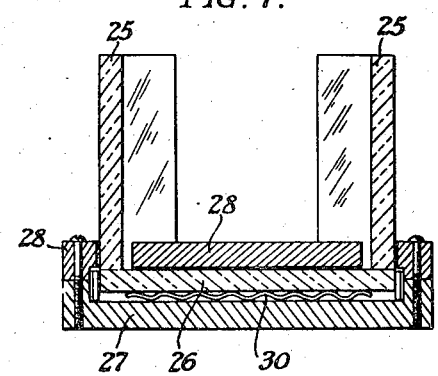

Fig. 7 shows a vertical section of the arrangement shown in Figs. 5 and 6.

Figure 8:
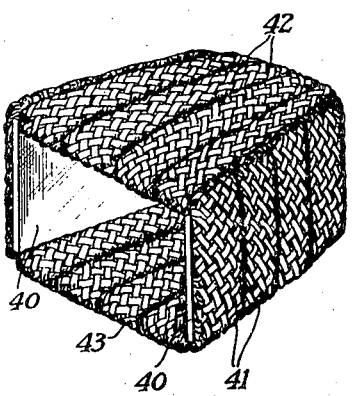

Fig. 8 shows a convenient manner of modifying standard pentareflectors to incorporate the present invention using braided copper tape as the shield.

Figure 9:
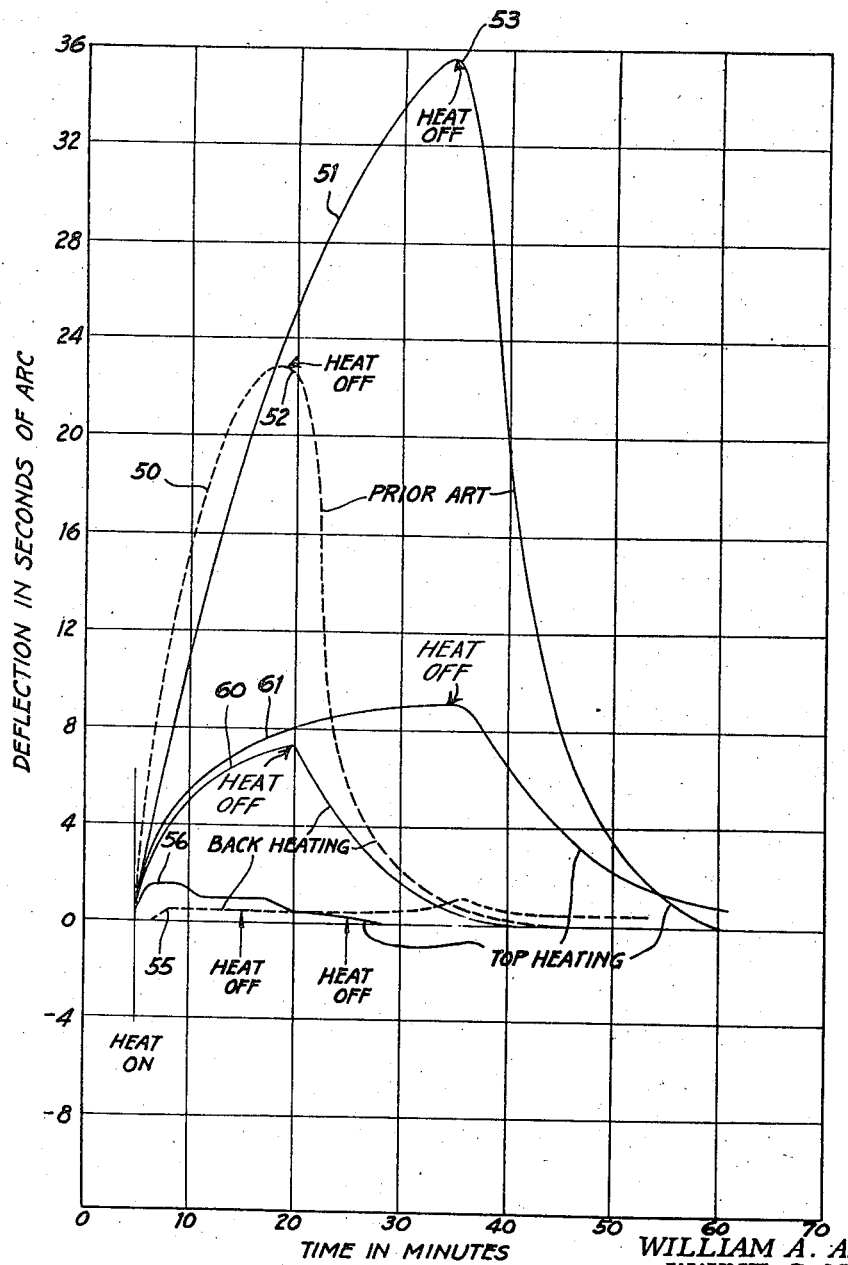

Fig. 9 illustrates graphically the results obtained with the present invention.

Figure 1:
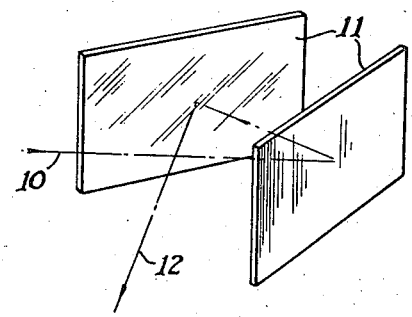
Fig. 1 shows a pair of reflectors used as an optical square or "pentareflector."

In Fig. 1 a light beam 10 strikes two front surface mirrors 11 which are at 45° to each other so that the emergent ray 12 is always at right angles to the incident beam 10 as long as the rays are in the same horizontal plane. Rotation of both mirrors together about a vertical axis does not affect the angle between the rays 10 and 12.

Figure 2:
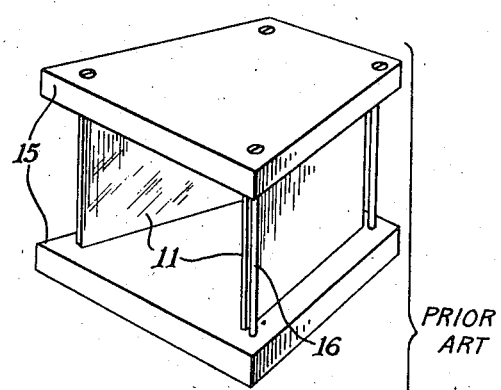
Figs. 2 and 3 show prior art forms of pentareflectors.
Figure 3:
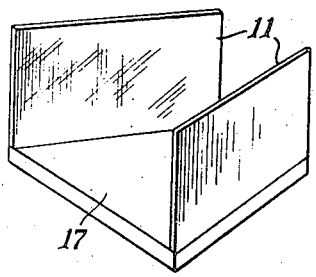

According to the prior art two such mirrors 11 are clamped between plates 15 by means of long bolts 16 as in Fig. 2 or are cemented to a block of glass or metal 17 as in Fig. 3. In either case, differences in temperature across the amount may change the relative position of the two mirrors and thus disturb their ability to insure constant deviation of the light exactly through 90°. It does not do to make the parts 15, 16, and 17 of ordinary metal since the thermal expansivity is then so high that resulting distortion induces considerable error. On the other hand if these plates are made of quartz or Invar, the thermal conductivity is so low that the residual expansivity is not evenly distributed and the errors are about as bad as in the first case, particularly when the effects are due to localized radiant heat, localized convection or conduction from a small source of heat.

According to the invention the arrangement shown in Fig. 2 is corrected as in Fig. 4 by having the mount made of a low expansivity material completely surrounded by a metal shield 20 part 21 of which is shown in broken lines to allow a clear illustration of the fact that the mirrors themselves support both the upper and lower plates of low expansivity material, eliminating entirely the clamping screws 16 of Fig. 2.

Similarly Figs. 5, 6, and 7 show a preferred embodiment which constitutes a direct application of the invention to the arrangement shown in Fig. 3. The front surface mirrors 25 are cemented to a quartz block 26; this block may alternatively be of Invar or other low expansivity material. This supporting block and the optically unused lower edge of the mirrors 25 are all completely surrounded by an aluminum housing made up of a base plate 27 and an upper plate 28. The upper plate 28 is provided with apertures 29 through which the mirrors 25 extend. The plate 28 comes close to but does not touch either of the mirrors 25. To insure that no distortion is transmitted from the shield to the mirrors, the connection between the block 26 and the shield 27 is by means of resilient spring members 30. Alternatively but less preferably, the block 26 may be clamped between the plates 27 and 28 but only over a small centrally located area such as indicated by broken lines 31 in Fig. 6. Since the block 26 would still be substantially free to move and since the relative position of the two mirrors 25 would be little affected by distortion in the field, this small area clamping arrangement provided by the two raised areas 31 is effectively resilient. The completely resilient arrangement provided by spring members 30 is preferable however.

In Fig. 8 a pentareflector is made up of two mirrors 40 cemented both top and bottom to plates of quartz or Invar. The outside of the unit is then wrapped completely in copper braid 41 and the quartz or Invar plates are, together with the adjacent portions of the braid 41, separately wrapped with more braid 42 and 43. This arrangement doesn't give quite as perfect results as that shown in Figs. 5 to 7, but it has been found to be perfectly satisfactory for all practical purposes. The optical elements, in this case the mirrors 40, are engaged and supported by members of low thermal expansivity which in turn are fully shielded by material (copper) of high thermal conductivity, and the braided arrangement of the copper provides the resiliency necessary in the connection between the shield and the supporting plates.

Considering the fact that quartz mountings have been previously used and metal plates have been previously used, although never arranged according to the present invention, the degree of the effect obtained by the present invention is astounding. Not only are thermal effects reduced, but for all practical purposes they are eliminated entirely. It is even difficult to tell in any experiment whether the residual minute effects that are detected are real or are due to the measuring means used. This is all illustrated in Fig. 9 which compares the prior art with the present invention. Since the major errors are transient, they are plotted against time abscissae. The ordinants are given as deflection of a light ray in seconds of arc but are intended merely for comparison. Two sets of experiments are shown, in one of which the unit being tested is heated by radiation from the top, a condition often encountered in practice under a hot sun. In the second set of experiments the unit is back heated which is also quite common in practice because the units are in general mounted inside a long tube which is open or transparent in front so that the combination of radiation, convection, and conduction is predominately from behind the unit. It will be seen from curves 50 and 51 that the errors grow rapidly as soon as the heat is turned on any prior pentareflector and become quite objectionable in twenty minutes or so. While the errors are still on the increase or at least as soon as they start to taper off as at the points 52 and 53 on the curves (which tapering off is due to the fact that the temperature gradient has reached a maximum and the temperature is becoming more uniformly distributed), the heat is turned off and the error rapidly drops down to zero. In a pentareflector thermal errors are primarily due to the gradient, and the absolute value of the temperature is less important so long as the temperature is uniformly distributed. Therefore, even if the heat were not turned off at the points 52 and 53, the error tends first to level off and then to come back toward zero. The curves 50 and 51 were actually run on a standard pentareflector in common use in range finders and height finders. The curves 60 and 61 were correspondingly run on an improved form of pentareflector in which the mounting material was made of Invar. The purpose of this change was to see whether Invar would not by itself simultaneously satisfy both the requirement as to low expansivity and the requirement as to high conductivity. The results show that it is better than standard arrangements but only by a factor of three which still leaves appreciable errors. Invar used for both the mount and for the outside shield with a resilient inner support would be better, of course, and would incorporate the present invention.

The results of the present invention are shown in curves 55 and 56 in which the mirrors were cemented to a quartz block as in Figs. 5 to 7, shielded by a copper housing. The resulting errors are so small as to be quite negligible. In fact the variations shown in the curves 55 and 56 may not be due to thermal effects at all. In curve 55 there was no effect at the moment the heat was turned on, there was no effect at the moment the heat was turned off, and there were two very minute changes which are unexplainable and which apparently have nothing to do with the thermal effects since they occurred at other times. The curve 56 does show a slight upswing when the heat is turned on and a slight drop when the heat is turned off, but as before these effects are quite negligible and are not even of the same order as those produced in prior devices.

In the above discussed Fig. 9, it will be noted that zero on the time scale is taken five minutes before the heat is turned on. The measuring means remained steady for five minutes at a value taken as zero deflection. The heat was then turned on and continued for a number of minutes (14 minutes for curve 50, 30 minutes for curve 51, 10 minutes for curve 55, 20 minutes for curve 56, 15 minutes for curve 60, and 30 minutes for curve 61). Since the "heat off" time is different for the different curves, it is marked by arrows to the curves themselves rather than to the time axis. It will be noted that the test for the present invention was, if anything, more stringent than that for the prior art, because in testing the present invention the heat was not turned off until there were definite indications that no further adverse effects would result, whereas in curves 50 and 51 it is obvious that the deflection would have become even worse if the heat had been continued.

Having thus described the preferred embodiment of our invention as applied to pentareflectors, we wish to point out that it is not limited to these particular devices but is applicable to any optical unit having two elements whose relative position is extremely critical and which is liable to be subjected to varying thermal conditions.

What we claim and desire to secure by Letters Patent of the United States is:

1. A mount for an optical unit having two reflectors fixed to deviate light through a constant angle on a fixed axis, comprising means made of material of low thermal expansivity rigidly engaging and supporting the two reflectors in alignment relative to said fixed axis, and a heat shield of high thermal conductivity closely and substantially completely covering all areas of said engaging and supporting means out of engagement with the reflectors, there being a portion of the shield between the said engaging and supporting means and the fixed axis covering the side of the engaging and supporting means which faces said fixed axis and there being no rigid connection between said means and said shield.

2. A mount according to claim 1 having resilient means holding apart the shield and the engaging means and supporting the latter.

3. A mount according to claim 1 in which said material is Invar.

4. In a pentareflector a support for the reflecting mirrors made of material of low thermal expansivity rigidly engaging the mirrors and a heat shield of high thermal conductivity covering the part of the support out of engagement with the reflector, without any rigid connection between the shield and the support.

WILLIAM A. ARNOLD.
WAYNE G. NORTON.

REFERENCES CITED

The following references are of record in the file of this patent:

UNITED STATES PATENTS

| Number | Name | Date |
|---|---|---|
| 2,400,111 | Gardner | May 14, 1946 |
| 2,179,862 | Rolph | Nov. 14, 1939 |
| 1,150,585 | Eppenstein | Aug. 17, 1915 |
| 1,027,420 | VonHofe | May 28, 1912 |
| 926,061 | Hahn | June 22, 1909 |
| 1,166,824 | Eppenstein | Jan. 4, 1916 |
| 1,869,512 | Schnobl | Aug. 2, 1932 |
| 1,105,895 | Eppenstein | Aug. 4, 1914 |

FOREIGN PATENTS

| Number | Country | Date |
|---|---|---|
| 7,392 | Great Britain | 1910 |